(12) United States Patent
Erickson et al.

(10) Patent No.: US 7,680,554 B2
(45) Date of Patent: Mar. 16, 2010

(54) METHOD FOR ASSOCIATING OBJECTS IN A MANUFACTURING PROCESS

(75) Inventors: Steven C. Erickson, Rochester, MN (US); Ivory Wellman Knipfer, Rochester, MN (US); Robert Noble Strong, San Jose, CA (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 11/612,981

(22) Filed: Dec. 19, 2006

(65) Prior Publication Data

US 2008/0147223 A1    Jun. 19, 2008

(51) Int. Cl.
*G06F 19/00*    (2006.01)
*G06F 9/45*    (2006.01)

(52) U.S. Cl. .......................... 700/115; 700/90; 700/95; 700/117

(58) Field of Classification Search .................. 700/90, 700/95, 115, 117
See application file for complete search history.

(56) References Cited

U.S. PATENT DOCUMENTS

| | | | |
|---|---|---|---|
| 6,036,087 A | 3/2000 | Hong et al. | |
| 6,246,787 B1* | 6/2001 | Hennessey et al. | 382/141 |
| 6,381,509 B1* | 4/2002 | Thiel et al. | 700/115 |
| 7,398,524 B2* | 7/2008 | Shapiro | 717/175 |
| 2002/0116083 A1* | 8/2002 | Schulze | 700/108 |
| 2002/0183881 A1 | 12/2002 | Wright | |
| 2006/0149407 A1 | 7/2006 | Markham et al. | |
| 2006/0212823 A1* | 9/2006 | Bhagat et al. | 715/783 |

* cited by examiner

*Primary Examiner*—Michael D Masinick
(74) *Attorney, Agent, or Firm*—Yee & Associates, P.C.; Steven L. Bennett

(57) ABSTRACT

A method for associating objects in a manufacturing process. In response to an occurrence of an event for an object, a time is recorded of the event for the object. Entries for parts and assemblies associated with the object are located within a database. An entry of the event for the object is created within the database. The entry includes the event for the object, the time of the event for the object, and the entries for the parts and the assemblies associated with the object.

7 Claims, 5 Drawing Sheets

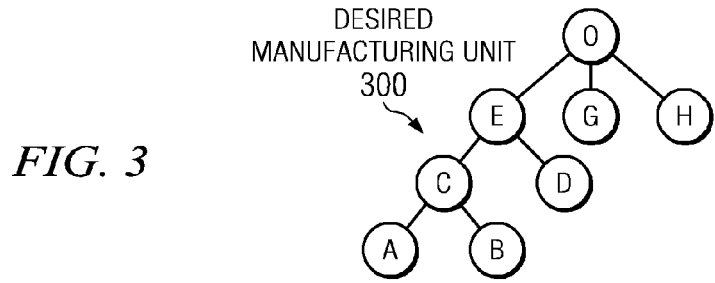

FIG. 3

| TIME | EVENTS TO BUILD DESIRED MANUFACTURING UNIT |
|---|---|
| t(1) | PART B IS PRE-TESTED THROUGH 3 DIFFERENT OPERATIONS |
| t(2) | PARTS A AND B ARE INSTALLED INTO ASSEMBLY C |
| t(3) | ASSEMBLY C IS LOADED WITH SOFTWARE AND RUN THROUGH A VERIFICATION OPERATION |
| t(4) | ASSEMBLY C AND PART D ARE INSTALLED INTO COMPUTER E |
| t(5) | COMPUTER E IS RUN THROUGH A SERIES OF TEST OPERATIONS |
| t(6) | COMPUTER E IS INSTALLED, ALONG WITH DEVICES G AND H, TO COMPLETE ORDER O |
| t(7) | ORDER O, WHICH CONTAINS COMPONENTS E, G, AND H, IS RUN THROUGH A SET OF REGRESSION TEST OPERATIONS R1, R2, AND R3 |

| TIME | RECORDING ACTIVITY |
|---|---|
| t(1) | RECORD PART B AS BEING PRE-TESTED THROUGH THE 3 DIFFERENT OPERATIONS |
| t(2) | RECORD PARTS A AND B AS INSTALLED INTO ASSEMBLY C |
| t(3) | RECORD ASSEMBLY C SOFTWARE LOAD AND COMPLETED VERIFICATION OPERATION. IN ADDITION, RECORD PARTS A AND B AS PART OF THE SOFTWARE LOAD AND VERIFICATION OPERATIONS PERFORMED ON ASSEMBLY C |
| t(4) | RECORD ASSEMBLY C AND PART D AS INSTALLED INTO COMPUTER E. IN ADDITION, ALSO RECORD PARTS A AND B AS INSTALLED IN COMPUTER E |
| t(5) | RECORD COMPUTER E AS RUN THROUGH A SERIES OF TEST OPERATIONS. IN ADDITION, RECORD THAT PARTS A, B, AND D, AS WELL AS ASSEMBLY C, ARE ALSO ASSOCIATED WITH THE SERIES OF TEST OPERATIONS PERFORMED ON COMPUTER E |
| t(6) | RECORD COMPUTER E AS INSTALLED, ALONG WITH DEVICES G AND H, TO COMPLETE ORDER O. IN ADDITION, PARTS A, B, AND D, AS WELL AS ASSEMBLY C, ALSO ARE ASSOCIATED WITH ORDER O |
| t(7) | RECORD ORDER O AS RUN THROUGH A SET OF REGRESSION TEST OPERATIONS R1, R2, AND R3. IN ADDITION, PARTS A, B, AND D; ASSEMBLY C; COMPUTER E; AND DEVICES G AND H ARE ALL ASSOCIATED WITH THE SET OF REGRESSION TEST OPERATIONS R1, R2, AND R3 PERFORMED ON ORDER O |

*FIG. 4*

DESIRED MANUFACTURING ORDER 402

ANOTHER SUBASSEMBLY 404

HISTORY TABLE 406

| | EVENTS TO BUILD DESIRED MANUFACTURING UNIT | PART ASSOCIATION | | |
|---|---|---|---|---|
| | | INSTALL RELATION | TIME ASSOCIATED | |
| | | | INSTALLED | REMOVED |
| EVENT 408 | INSTALL PART A INTO SUBASSEMBLY C | A → C | t(1) | |
| EVENT 410 | INSTALL PART B INTO SUBASSEMBLY C | A → C<br>B → C | t(1)<br>t(2) | |
| EVENT 412 | INSTALL SUBASSEMBLY C INTO FINAL ASSEMBLY E | A → C<br>B → C<br>C → E<br>A → E<br>B → E | t(1)<br>t(2)<br>t(3)<br>t(3)<br>t(3) | |
| EVENT 414 | REMOVE PART A FROM SUBASSEMBLY C | A → C<br>B → C<br>C → E<br>A → E<br>B → E | t(1)<br>t(2)<br>t(3)<br>t(3)<br>t(3) | t(4)<br><br><br>t(4)<br> |
| EVENT 416 | INSTALL PART A' INTO SUBASSEMBLY C | A → C<br>B → C<br>C → E<br>A → E<br>B → E<br>A' → C<br>A' → E | t(1)<br>t(2)<br>t(3)<br>t(3)<br>t(3)<br>t(5)<br>t(5) | t(4)<br><br><br>t(4)<br><br><br> |
| EVENT 418 | INSTALL ASSEMBLY E TO COMPLETE ORDER O | A → C<br>B → C<br>C → E<br>A → E<br>B → E<br>A' → C<br>A' → E<br>A' → O<br>B → O<br>C → O<br>E → O | t(1)<br>t(2)<br>t(3)<br>t(3)<br>t(3)<br>t(5)<br>t(5)<br>t(6)<br>t(6)<br>t(6)<br>t(6) | t(4)<br><br><br>t(4)<br><br><br><br><br><br><br> |
| EVENT 420 | INSTALL PART A INTO SUBASSEMBLY J | A → C<br>A → E<br>A → J | t(1)<br>t(3)<br>t(7) | t(4)<br>t(4)<br> |

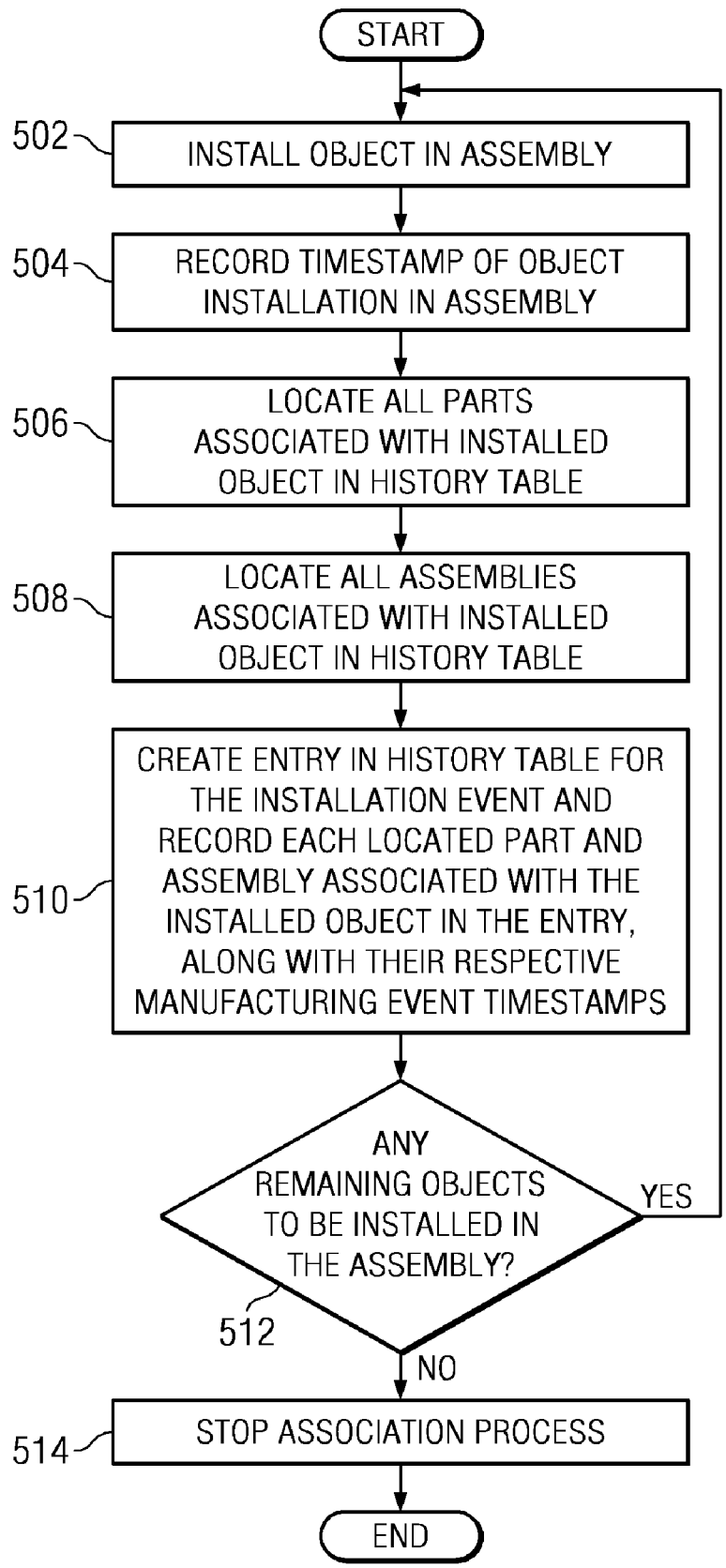

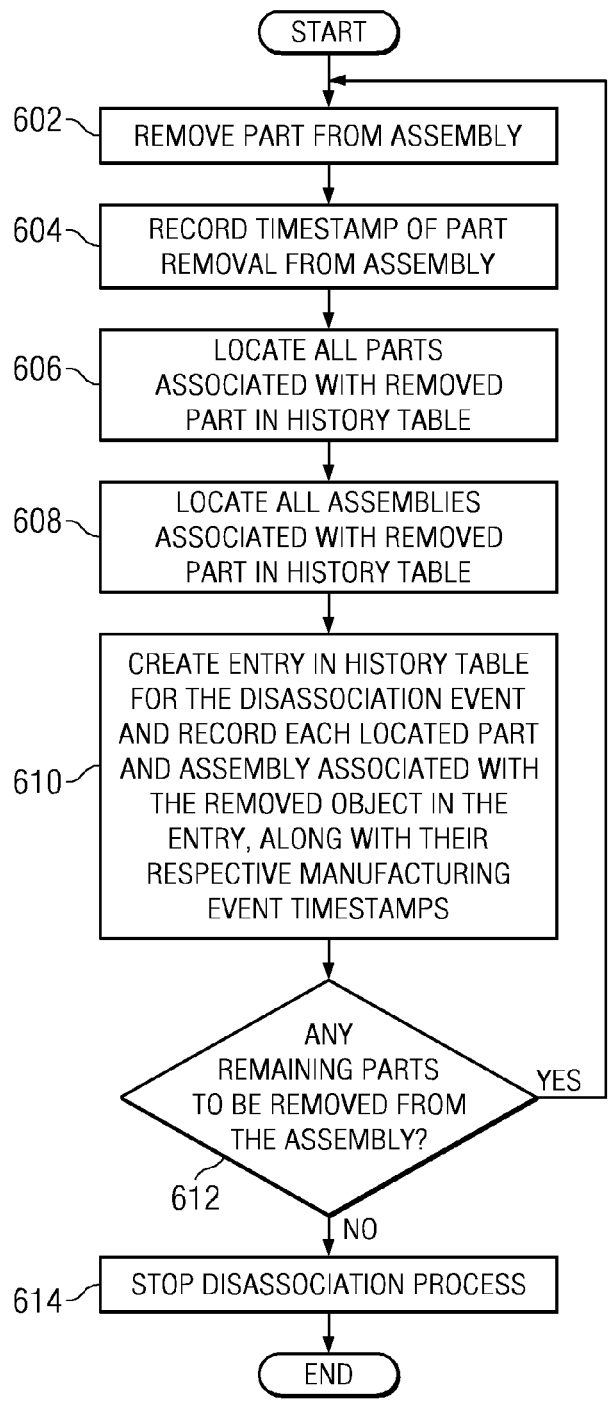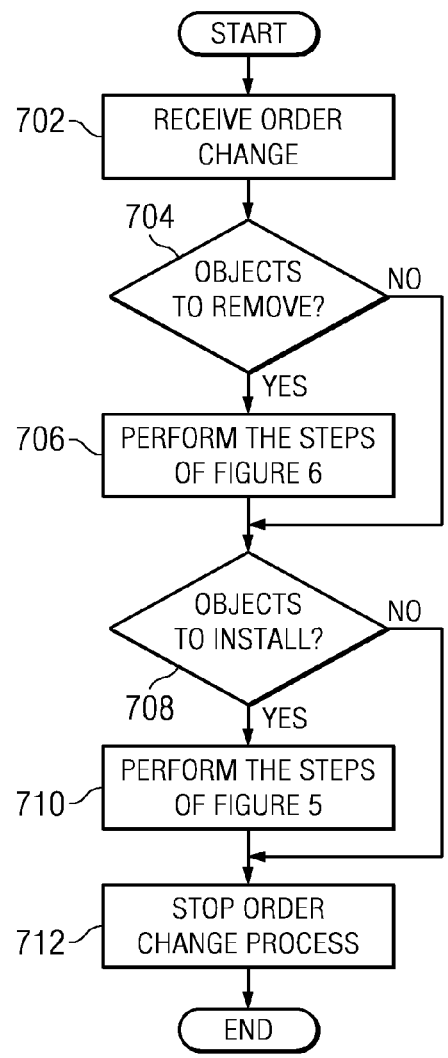

METHOD FOR ASSOCIATING OBJECTS IN A MANUFACTURING PROCESS

BACKGROUND OF THE INVENTION

1. Field of the Invention

The present invention relates generally to an improved data processing system. More specifically, the present invention is directed to a computer implemented method, system, and computer usable program code for associating parts and assemblies to an object in a manufacturing process.

2. Description of the Related Art

Today, tracking part histories for serialized parts is extremely difficult because there is not a convenient, practical system for following such parts across multiple levels of product structure and multiple uses of the same instance of a part. Real-time collection and analysis of production data has become a central issue in manufacturing operations. On the other hand, real-time data collection is particularly difficult to carry out in the context of general manufacturing operations. This difficulty arises from the requirement for effective real-time analysis that data collection be rapid and substantially error-free.

Conventional quality control systems have relied upon manual recordation of production data prior to analysis. Manual entry of data into the computer's database degrades the effectiveness of automated production analysis for two basic reasons. First, data manually entered unavoidably contains errors, whether from incorrectly inputting the data or simply losing the data. Second, manual data entry creates an inherent processing bottleneck in the analysis process because human operators cannot achieve data entry rates even approaching those of automated systems.

There is increasing pressure in a configurable build-to-order manufacturing process to produce products that match specific customer requirements with extremely short manufacturing process cycle times. These build-to-order products may be made up of thousands of parts and assemblies from multiple manufacturing locations and suppliers. The parts and assemblies may be new, returned and refurbished, equivalent to new (ETN), used for process verification, reconfigured, previously rejected but now verified as good, et cetera. The typical manufacturing process that considers all of these types of parts and assemblies as "equal" does not allow for shortened manufacturing process cycle times while maintaining a high level of quality, which the customer expects.

Currently, manufacturing process control systems are only concerned with the current status of a part. The historical status of a part at a given point in time is typically not maintained. Or at best, the historical status may only be ascertained by following a meager "breadcrumb trail" across multiple databases after extensive research or data mining. Also, a potential for data loss may exist when the part is built into a lower-level assembly, which is later built into a finished product, if proper historical ties are not in place across the databases. Existing "industry standard" manufacturing process control systems are not capable of solving these problems.

Therefore, it would be beneficial to have an improved computer implemented method, system, and computer usable program code for maintaining part associations through all activities a part has been involved in for the life of that part, regardless of the assembly level that performed that activity.

BRIEF SUMMARY OF THE INVENTION

Illustrative embodiments provide a computer implemented method, system, and computer usable program code for associating objects in a manufacturing process. In response to an occurrence of an event for an object, a time is recorded of the event for the object. Entries for parts and assemblies associated with the object are located within a database. An entry of the event for the object is created within the database. The entry includes the event for the object, the time of the event for the object, and the entries for the parts and the assemblies associated with the object.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary illustration of recording activity in a manufacturing process to build a desired manufacturing unit in accordance with an illustrative embodiment;

FIG. 4 is an exemplary illustration of a history table for manufacturing events in accordance with an illustrative embodiment;

FIG. 5 is a flowchart illustrating an exemplary process for associating parts and assemblies with an object in accordance with an illustrative embodiment;

FIG. 6 is a flowchart illustrating an exemplary process for disassociating an object from parts and assemblies in accordance with an illustrative embodiment; and FIG. 7 is a flowchart illustrating an exemplary process for changing an order in accordance with an illustrative embodiment.

DETAILED DESCRIPTION OF THE INVENTION

Figure 1:
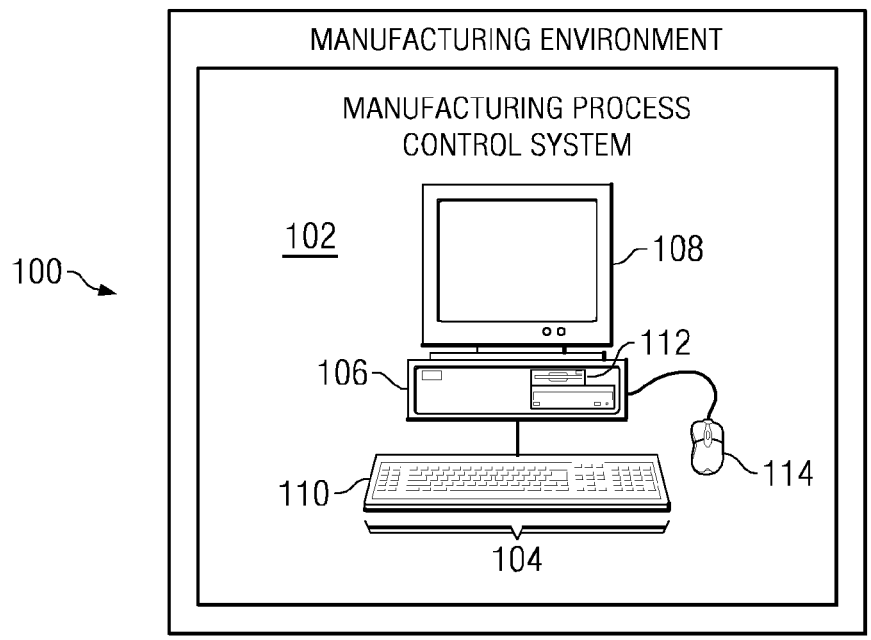
FIG. 1 is a pictorial representation of a manufacturing environment in which illustrative embodiments may be implemented.
Figure 2:
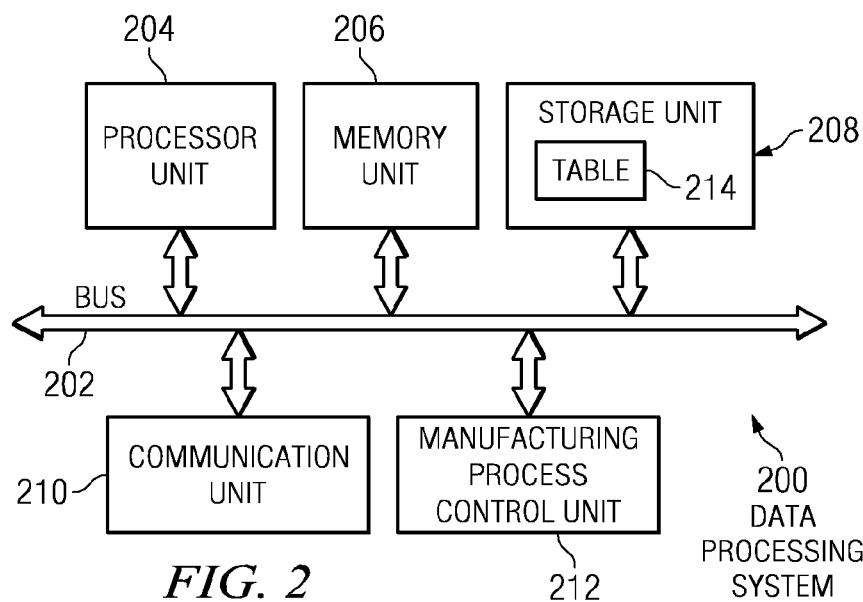
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to FIG. 1, FIG. 1 depicts a pictorial representation of a manufacturing environment in which illustrative embodiments may be implemented. Manufacturing environment 100 may, for example, represent one or more manufacturing facilities, which build manufacturing units from individual parts and assemblies. A manufacturing unit is a final product produced by a manufacturing process. For example, the manufacturing unit may, for example, be a build-to-order computer. However, it should be noted that manufacturing environment 100 may utilize illustrative embodiments to produce any type of manufacturing unit.

Manufacturing environment 100 includes manufacturing process control system 102. Manufacturing environment 100 utilizes manufacturing process control system 102 to monitor, control, and record the manufacturing process for building the manufacturing units. Manufacturing process control system 102 includes all equipment and components necessary to build the manufacturing units.

Also, manufacturing process control system 102 may, for example, include a single computer, such as computer 104, for control of the manufacturing process and data processing. Alternatively, manufacturing process control system 102 may include a plurality of computers and other devices coupled together via a network. Manufacturing process control system 102 uses the network to provide communications links between the various computers and other devices connected together within the network. The network may include connections, such as wire, wireless communication links, or fiber optic cables.

In addition, manufacturing process control system 102 may include one or more servers coupled to the network, along with one or more storage units. The one or more servers may provide data, such as boot files, operating system images, and applications to the various computers and other devices coupled to the network. The one or more storage units may provide data storage capabilities for manufacturing process control system 102.

The network may, for example, be the Internet, which represents a worldwide collection of networks and gateways that use the Transmission Control Protocol/Internet Protocol (TCP/IP) suite of protocols to communicate with one another. Of course, manufacturing process control system 102 also may use a number of different types of networks, such as, for example, an intranet, a local area network (LAN), or a wide area network (WAN).

Computer 104 includes system unit 106, video display terminal 108, keyboard 110, storage devices 112, which may include floppy drives and other types of permanent and removable storage media, and mouse 114. Also, computer 104 may include additional input devices. Examples of additional input devices include a joystick, touchpad, touch screen, trackball, microphone, and the like.

Computer 104 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems, such as a network computer. Computer 104 also preferably includes a graphical user interface (GUI) that may be implemented by means of systems software residing in computer readable media in operation within computer 104. FIG. 1 is only intended as an example and not as an architectural limitation for different embodiments.

Next, FIG. 2 depicts a block diagram of a data processing system in which illustrative embodiments may be implemented. Data processing system 200 is an example of a computer, such as computer 104 in FIG. 1, in which code or instructions implementing the processes of the illustrative embodiments may be located.

In the depicted example, data processing system 200 employs a bus architecture, such as bus 202. Bus 202 may include one or more buses. In addition, bus 202 may be implemented using any type of communication fabric or architecture that provides for a transfer of data between the different components and devices coupled to bus 202.

Data processing system 200 includes processor unit 204, memory unit 206, storage unit 208, communication unit 210, and manufacturing process control unit 212, which connect to bus 202. However, it should be noted that data processing system 200 is only shown for exemplary purposes and is not meant as an architectural limitation to illustrative embodiments. In other words, data processing system 200 may include more or fewer components as necessary to accomplish processes of illustrative embodiments for associating parts and assemblies to an installed or removed object within a desired manufacturing unit.

Processor unit 204 provides the data processing capabilities of data processing system 200. An operating system (OS) runs on processing unit 204. This OS coordinates and controls various components within data processing system 200. The OS may be a commercially available OS, such as, for example, Microsoft® Windows XP®. Microsoft® and Windows XP® are trademarks of Microsoft Corporation in the United States, other countries, or both. An object oriented programming system, such as the Java™ programming system, may run in conjunction with the OS and provides calls to the OS from Java™ programs or applications executing on data processing system 200. Java™ and all Java-based trademarks are trademarks of Sun Microsystems, Inc. in the United States, other countries, or both.

Storage unit 208 is a non-volatile data storage device that may, for example, be configured as ROM and/or flash ROM to provide the non-volatile memory for storing the OS, applications, and/or other data. Storage unit 208 stores the instructions or computer usable program code for the OS and applications. The instructions are loaded into memory unit 206 for execution by processor unit 204. Processor unit 204 performs processes of illustrative embodiments by executing the computer usable program code that is loaded into memory unit 206. Additionally, the processes of the illustrative embodiments may be applied to a multiprocessor data processing system.

The other data stored in storage unit 208 may, for example, be manufacturing process events, timestamps for the manufacturing process events, and all parts and assemblies associated with the manufacturing process events for manufacturing units. The manufacturing process events may, for example, be the installation, or association, of an object in an assembly or the removal, or disassociation, of an object from an assembly. The object may be a part or a subassembly. The timestamp is the time at which the manufacturing process event occurred. All the parts and assemblies associated with the manufacturing process event are each individual part and/or assembly that is, or was, associated with the object at one point in time during the manufacturing process to build the manufacturing unit.

Although in this exemplary illustration, data processing system 200 includes storage unit 208, storage unit 208 may, for example, reside in another data processing system. Or, storage unit 208 may be a stand alone storage device at a remote site. Further, storage unit 208 may, for example, be a database, which stores data in a structured or unstructured format. The structured format may, for example, be a table or a plurality of tables containing indexed data.

In this example of FIG. 2, data processing system 200 stores the other data, which includes the manufacturing process events, the timestamps for the manufacturing process events, and all the parts and assemblies associated with the manufacturing process events, in table 214 within storage unit 208. Moreover, it should be noted that storage unit 208 may contain any other necessary data for processes of illustrative embodiments to properly execute.

Data processing system 200 uses communication unit 210 to communicate with other data processing systems and devices via a network. Communication unit 210 may include one or more devices used to transmit and receive data. For example, communication unit 210 may include a network adapter and/or a modem to send and receive wire and wireless transmissions.

Data processing system 200 uses manufacturing process control unit 212 to record, organize, and manage history table entries within one or more databases for the manufacturing process, which produces the manufacturing units. It should be noted that a user or a system administrator of data processing system 200 may enable and disable manufacturing process control unit 212 independently of other components of data processing system 200. Further, it should be noted that manufacturing process control unit 212 may be implemented entirely as software, hardware, or a combination of software and hardware components. Furthermore, even though in this exemplary illustration manufacturing process control unit 212 resides in data processing system 200, manufacturing process control unit 212 may be remotely located.

The depicted examples in FIG. 1 and FIG. 2 are not meant to imply architectural limitations. In addition, the illustrative embodiments provide for a computer implemented method, system, and computer usable program code for compiling source code and for executing code. The methods described with respect to the depicted embodiments may be performed in a data processing system, such as computer 104 shown in FIG. 1 or data processing system 200 shown in FIG. 2.

Illustrative embodiments provide a computer implemented method, system, and computer usable program code for managing associations between objects in a manufacturing process. In response to an occurrence of a manufacturing event for an object in the manufacturing process to produce a manufacturing unit, a manufacturing process control system uses a manufacturing process control unit to record a timestamp for the manufacturing event for the object. The manufacturing unit may be a build-to-order product. The manufacturing event may be an installation of the object within an assembly or order or a removal of the object from an assembly or order. The object may be a part or a subassembly.

After recording the event time, the manufacturing process control unit locates all entries within one or more databases or storage units for parts and assemblies associated with the object. In addition, the manufacturing process control unit creates an entry for the manufacturing event for the object in a history table within the database. The entry includes the event for the object, the time of the event for the object, and the entries for the parts and the assemblies associated with the object. The entries for the parts and the assemblies associated with the object also include an event and an event time for each of the parts and the assemblies associated with the object. Also, the history table is in a format that is capable of being recalled and displayed within a display device by a user for review purposes.

In a manufacturing environment it is useful to know the history of individual serialized parts. History means recording which assembly the part is installed in, which assemblies the part was installed in, and the steps and/or operations performed on the part while installed in the various assemblies. When a part is determined to be defective, either during or after the manufacturing process, it is critical to be able to trace the history of the part to verify that all quality control steps/operations were completed and to determine how much run-time and in which configurations the part has been previously used. Further, it is critical to be able to trace the history of the part in the manufacturing process to determine which steps/operations were already completed on the part so that only the remaining steps/operations may be completed without performing redundant steps, which may reduce the manufacturing process cycle.

Using illustrative embodiments it is possible to quickly determine the history of the failing component to see which steps/operations were completed, which assemblies the part has been installed in, et cetera. Consequently, a real-time assessment may be made as assemblies are routed through test operations to determine what test coverage exists on the parts in the assembly. This real-time assessment may be performed without complex data mining and may ensure that product quality to the customer is not compromised. Ultimately, this real-time assessment may decrease manufacturing cycle time and, thus, may decrease product shipping times, increase customer satisfaction, and possibly increase revenue as well.

In addition, illustrative embodiments may enable a user to produce specific types of reports relating to a particular part. For example, a user may query a database for a particular part by using the part number/serial number to produce a report containing every product instance that particular part has been installed in, at any point in the part's history, and at any level in the structure. Further, the report may contain all manufacturing steps/operations/tests that the part has passed through while installed in any level of an assembly or order. Furthermore, the report may also include any fail information, repair actions, and related information that is applicable to the assembly or order that the part was installed in while the part was installed.

Moreover, illustrative embodiments may enable a user to produce a complete history report for a finished product. The complete history report may, for example, include every part number/serial number that has ever been installed in that product or the product's lower-level assemblies at any point in the product's history. Also, the complete history report may include all manufacturing steps/operations/tests that the finished product, the product's assemblies, and any of the product's parts went through at any point in time.

With reference now to FIG. 3, an exemplary illustration of recording activity in a manufacturing process to build a desired manufacturing unit is depicted in accordance with an illustrative embodiment. Desired manufacturing unit 300 may, for example, be a customer order for a configurable product. However, it should be noted that desired manufacturing unit 300 may be any type of product that may be produced by a manufacturing process. Desired manufacturing unit 300 is a graphical depiction of the association or interconnection between components required to build the configurable customer order.

Events to build desired manufacturing unit 300 are the order of events or steps required to produce desired manufacturing unit 300. Recording activity 304 is the recordation of events to build desired manufacturing unit 302. Recording activity 304 not only records the manufacturing events as the manufacturing events occur, but also the time of the occurrence of the event.

In the exemplary illustration of FIG. 3, events to build desired manufacturing unit 300 includes events 306, 308, 310, 312, 314, 316, and 318. Recording activity 304 includes entries 320, 322, 324, 326, 328, 330, and 332. Entries 320, 322, 324, 326, 328, 330, and 332 are entries in, for example, a table, such as table 214 in FIG. 2, that record the manufacturing process for building desired manufacturing unit 300. Moreover, entries 320, 322, 324, 326, 328, 330, and 332 are record entries for manufacturing events 306, 308, 310, 312, 314, 316, and 318, respectively.

For example, in event 306, which a manufacturing process control system, such as manufacturing process control system 102 in FIG. 1, performs at time t(1), part B is pre-tested through 3 different operations. In the respective recording activity for event 306, entry 320 records part B as being pre-tested through the 3 different operations at time t(1). In event 308, which the manufacturing process control system performs at time t(2), parts A and B are installed into assembly C. In the respective recording activity for event 308, entry 322 records parts A and B as being installed into assembly C at time t(2). In event 310, which the manufacturing process control system performs at time t(3), assembly C is loaded with software and run through a verification operation. In the respective recording activity for event 310, entry 324 records assembly C as being loaded with the software and run through the verification operation at time t(3). In addition, entry 324 records parts A and B as being part of the software load and verification operations performed on assembly C at time t(3).

In event 312, which the manufacturing process control system performs at time t(4), assembly C and part D are installed into computer E. In the respective recording activity for event 312, entry 326 records assembly C and part D as being installed into computer E at time t(4). In addition, entry 326 records parts A and B as being installed in computer E at time t(4). In event 314, which the manufacturing process control system performs at time t(5), computer E is run through a series of test operations. In the respective recording activity for event 314, entry 328 records computer E as being run through a series of test operations at time t(5). In addition, entry 328 records that parts A, B, and D, as well as assembly C, also are associated with the series of test operations performed on computer E at time t(5).

In event 316, which the manufacturing process control system performs at time t(6), computer E is installed, along with devices G and H, to complete order O, which is the finished product for desired manufacturing unit 300. In the respective recording activity for event 316, entry 330 records computer E as being installed, along with devices G and H, to complete order O at time t(6). In addition, entry 330 records parts A, B, and D, as well as assembly C, also as being associated with order O at time t(6).

Finally, in event 318, which the manufacturing process control system performs at time t(7), order O, which contains components E, G, and H, is run through a set of regression test operations R1, R2, and R3. In the respective recording activity for event 318, entry 332 records order O as being run through the set of regression test operations R1, R2, and R3 at time t(7). In addition, entry 332 records parts A, B, and D; assembly C; computer E; and devices G and H also as being associated with the set of regression test operations R1, R2, and R3 performed on order O at time t(7). Thus, the manufacturing process control system, which utilizes an illustrative embodiment, is able to associate all parts and assemblies utilized in the production of desired manufacturing unit 300.

With reference now to FIG. 4, an exemplary illustration of a history table for manufacturing events is depicted in accordance with an illustrative embodiment. Desired manufacturing order 402 may, for example, be a prototype of a future production model. Desired manufacturing order 402 is a graphical depiction of the association between components required to build the prototype. Another subassembly 404 is a graphical depiction of a subassembly that incorporates a part that was previously removed from another subassembly in desired manufacturing order 402.

History table 406 is a table, such as, for example, table 214 in FIG. 2, of data entries to record the history of manufacturing events. History table 406 may, for example, be stored in a database or storage unit, such as, for example, storage unit 208 in FIG. 2. A manufacturing process control unit, such as, for example, manufacturing process control unit 212 in FIG. 2, utilizes history table 406 to record the history of manufacturing events in the manufacturing process to build desired manufacturing order 402 and another subassembly 404. History table 406 includes entries for events 408, 410, 412, 414, 416, 418, and 420.

Event 408 installs or associates part A into subassembly C at time t(1). The manufacturing process control unit records an entry in history table 406 for event 408 as, for example, A→C install time t(1). Event 410 installs part B into subassembly C at time t(2). The manufacturing process control unit records an entry in history table 406 for event 410 as, for example, A→C install time t(1) and B→C install time t(2). It should be noted that in the entry for event 410, the manufacturing process control unit rerecords the entry for event 408 in order to provide a complete record of associations at each manufacturing event or step in the manufacturing process, along with respective association times. This association principle of recording will become more evident with the following examples in history table 406.

Event 412 installs subassembly C into final assembly E at time t(3). The manufacturing process control unit records an entry in history table 406 for event 412 as, for example, A→C install time t(1); B→C install time t(2); C→E install time t(3); A→E install time t(3); and B→E install time t(3). Event 414 removes or disassociates part A from subassembly C. Part A may be removed from subassembly C to, for example, incorporate a newer version of part A into subassembly C. The manufacturing process control unit records an entry in history table 406 for event 414 as, for example, A→C install time t(1) and remove time t(4); B→C install time t(2); C→E install time t(3); A→E install time t(3) and remove time t(4); and B→E install time t(3).

Event 416 installs part A' into subassembly C to replace previously removed part A. The manufacturing process control unit records an entry in history table 406 for event 416 as, for example, A→C install time t(1) and remove time t(4); B→C install time t(2); C→E install time t(3); A→E install time t(3) and remove time t(4); B→E install time t(3); A'→C install time t(5); and A'→E install time t(5). Finally, event 418 installs assembly E to complete order O. The manufacturing process control unit records an entry in history table 406 for event 418 as, for example, A→C install time t(1) and remove time t(4); B→C install time t(2); C→E install time t(3); A→E install time t(3) and remove time t(4); B→E install time t(3); A'→C install time t(5); A'→E install time t(5); A'→O install time t(6); B→O install time t(6); C→O install time t(6); and E→O install time t(6). Thus, the manufacturing process control unit associates all parts and assemblies utilized in the production of desired manufacturing order 402.

However, history table 406 also includes event 420. Event 420 installs previously removed part A from subassembly C into subassembly J, such as another subassembly 404. As a result, the manufacturing process control unit records an entry in history table 406 for event 420 as, for example, A→C install time t(1) and remove time t(4); A→E install time t(3) and remove time t(4); and A→J install time t(7). But, it should be noted that the manufacturing process control unit may, for example, store event 420 as an entry in a separate table from events 408, 410, 412, 414, 416, and 418 within the database or storage unit.

With reference now to FIG. 5, a flowchart illustrating an exemplary process for associating parts and assemblies with an object is shown in accordance with an illustrative embodiment. The process shown in FIG. 5 may be implemented in a manufacturing process control system, such as, for example, manufacturing process control system 102 in FIG. 1.

The process begins when the manufacturing process control system installs or associates an object in an assembly (step 502). The object may be a part or a subassembly. Subsequent to installing the object in the assembly in step 502, the manufacturing process control system uses a manufacturing process control unit, such as, for example, manufacturing process control unit 212 in FIG. 2, to record a timestamp or time of the installation of the object in the assembly (step 504). After recording the installation time of the object in step 504, the manufacturing process control unit locates all parts associated with the installed object in a history table within a database, such as, for example, table 214 within storage unit 208 in FIG. 2 (step 506).

Subsequent to, or concurrent with, locating all parts associated with the installed object in step 506, the manufacturing process control unit locates all assemblies associated with the installed object in the history table (step 508). However, it should be noted that all parts and assemblies associated with the installed object may be located in a plurality of history tables within a plurality of databases or storage units. After locating all parts and assemblies associated with the installed object in the history table in steps 506 and 508, the manufacturing process control unit creates an entry in the history table for the installation event and records each located part and assembly associated with the installed object in the entry, along with their respective manufacturing event timestamps (step 510).

Subsequent to creating the entry in the history table for the installation event and recording each located part and assembly associated with the installed object in the entry, along with their respective manufacturing event timestamps, in step 510, the manufacturing process control system makes a determination as to whether any remaining objects need to be installed in the assembly (step 512). If the manufacturing process control system makes a determination that another object does need to be installed in the assembly, yes output of step 512, then the process returns to step 502 where the manufacturing process control system installs the next object in the assembly. If the manufacturing process control system makes a determination that another object does not need to be installed in the assembly, no output of step 512, then the manufacturing process control system stops the association process (step 514). The process terminates thereafter.

With reference now to FIG. 6, a flowchart illustrating an exemplary process for disassociating an object from parts and assemblies is shown in accordance with an illustrative embodiment. The process shown in FIG. 6 may be implemented in a manufacturing process control system, such as, for example, manufacturing process control system 102 in FIG. 1.

The process begins when the manufacturing process control system removes or disassociates an object from an assembly (step 602). Subsequent to removing the object from the assembly in step 602, the manufacturing process control system uses a manufacturing process control unit, such as, for example, manufacturing process control unit 212 in FIG. 2, to record a timestamp of the removal of the object from the assembly (step 604). After recording the removal time of the object in step 604, the manufacturing process control unit locates all parts associated with the removed object in a history table within a database, such as, for example, table 214 within storage unit 208 in FIG. 2 (step 606).

Subsequent to, or concurrent with, locating all parts associated with the removed object in step 606, the manufacturing process control unit locates all assemblies associated with the removed object in the history table (step 608). However, it should be noted that all parts and assemblies associated with the removed object may be located in a plurality of history tables within a plurality of databases or storage units. After locating all parts and assemblies associated with the removed object in the history table in steps 606 and 608, the manufacturing process control unit creates an entry in the history table for the disassociation event and records each located part and assembly associated with the removed object in the entry, along with their respective manufacturing event timestamps (step 610).

Subsequent to creating the entry in the history table for the disassociation event and recording each located part and assembly associated with the removed object in the entry, along with their respective manufacturing event timestamps, in step 610, the manufacturing process control system makes a determination as to whether any remaining objects need to be removed from the assembly (step 612). If the manufacturing process control system makes a determination that another object does need to be removed from the assembly, yes output of step 612, then the process returns to step 602 where the manufacturing process control system removes the next object from the assembly. If the manufacturing process control system makes a determination that another object does not need to be removed from the assembly, no output of step 612, then the manufacturing process control system stops the disassociation process (step 614). The process terminates thereafter.

With reference now to FIG. 7, a flowchart illustrating an exemplary process for changing an order is shown in accordance with an illustrative embodiment. The process shown in FIG. 7 may be implemented in a manufacturing process control system, such as, for example, manufacturing process control system 102 in FIG. 1.

The process begins when the manufacturing process control system receives a change in an order (step 702). The change may be a reconfiguration or alteration of the order or a cancellation of the order. Subsequent to receiving the order change, the manufacturing process control system makes a determination as to whether any objects need to be removed from the order (step 704).

If the manufacturing process control system makes a determination that an object does need to be removed from the order, yes output of step 704, then the process returns to step 602 in FIG. 6 where the manufacturing process control system removes the object and proceeds to perform steps 604, 606, 608, 610, 612, and 614 (step 706). After performing all the FIG. 6 steps in step 706, the process proceeds forward to step 708. If the manufacturing process control system makes a determination that an object does not need to be removed from the order, no output of step 704, then the manufacturing process control system makes a determination as to whether any objects need to be installed in the order (step 708).

If the manufacturing process control system makes a determination that an object does need to be installed in the order, yes output of step 708, then the process returns to step 502 in FIG. 5 where the manufacturing process control system installs the object and proceeds to perform steps 504, 506, 508, 510, 512, and 514 (step 710). After performing all the FIG. 5 steps in step 710, the process proceeds forward to step 712. If the manufacturing process control system makes a determination that an object does not need to be installed in the order, no output of step 708, then the manufacturing process control system stops the order change process (step 712). The process terminates thereafter. However, those of ordinary skill in the art will appreciate that step 708 may be performed prior to step 704 or concurrently with step 704.

Further, it should be noted that the exemplary process illustrated in FIG. 7 for altering or canceling an order that is partially or completely built in the manufacturing process may, for example, be modified to include processes for re-associating an assembly built for one order and installed in a new order. Also, the exemplary process illustrated in FIG. 7 may be modified to include processes for associating vendor-built assemblies in an order. When a vendor-built assembly is installed against an order, illustrative embodiments perform the associative steps for all the vendor-built assembly parts based on electronic data interchange (EDI) information provided by the vendor so that lower-level relationships or associations are not lost.

Thus, illustrative embodiments provide a computer implemented method, system, and computer usable program code for maintaining part associations through all activities a part has been involved in for the life of that part, regardless of the assembly level that performed that activity. The invention can take the form of an entirely hardware embodiment, an entirely software embodiment, or an embodiment containing both hardware and software elements. In a preferred embodiment, the invention is implemented in software, which includes but is not limited to firmware, resident software, microcode, et cetera.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) can be coupled to the system either directly or through intervening I/O controllers.

Network adapters also may be coupled to the system to enable the data processing system to become coupled to other data processing systems, remote printers, or storage devices through intervening private or public networks. Modems, cable modem, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system within a manufacturing environment for associating objects in a manufacturing process, the computer implemented method comprising:

determining by the data processing system whether one or more parts or subassemblies need to be installed in a manufacturing unit during a manufacturing process to build the manufacturing unit;

responsive to determining that one or more parts or subassemblies need to be installed in the manufacturing unit, installing by the data processing system the one or more parts or subassemblies in the manufacturing unit;

recording by the data processing system a time for when the one or more parts or subassemblies were installed in the manufacturing unit;

locating entries for all parts and subassemblies associated with each of the one or more parts or subassemblies installed in the manufacturing unit within a database by the data processing system;

creating an entry within the database by the data processing system that includes an installing event for each of the one or more parts or subassemblies installed in the manufacturing unit, the time of the installing event for each of the one or more parts or subassemblies installed in the manufacturing unit, and the entries for all the parts and the subassemblies associated with each of the one or more parts or subassemblies installed in the manufacturing unit;

determining by the data processing system whether one or more previously installed parts or subassemblies need to be removed from the manufacturing unit during the manufacturing process to build the manufacturing unit;

responsive to determining that one or more previously installed parts or subassemblies need to be removed from the manufacturing unit, removing by the data processing system the one or more previously installed parts or subassemblies from the manufacturing unit;

recording by the data processing system a time for when the one or more previously installed parts or subassemblies were removed from the manufacturing unit;

locating entries for all parts and subassemblies associated with each of the one or more previously installed parts or subassemblies removed from the manufacturing unit within a database by the data processing system; and creating an entry within the database by the data processing system that includes a removing event for each of the one or more previously installed parts or subassemblies removed from the manufacturing unit, the time of the removing event for each of the one or more parts or subassemblies installed in the manufacturing unit, and the entries for all the parts and the subassemblies associated with each of the one or more previously installed parts or subassemblies removed from the manufacturing unit.

2. The computer implemented method of claim 1, wherein the entries for all parts and subassemblies associated with each of the one or more parts or subassemblies installed in the manufacturing unit include an event and an event time for each of the all parts and subassemblies associated with each of the one or more parts or subassemblies installed in the manufacturing unit, and wherein the entries for all parts and subassemblies associated with each of the one or more previously installed parts or subassemblies removed from the manufacturing unit include an event and an event time for each of the all parts and subassemblies associated with each of the one or more previously installed parts or subassemblies removed from the manufacturing unit.

3. The computer implemented method of claim 1, wherein the database includes a table, and wherein the table is a history table of manufacturing events in the manufacturing process to build the manufacturing unit.

4. The computer implemented method of claim 1, wherein the manufacturing unit is a build-to-order product.

5. The computer implemented method of claim 3, wherein the history table is one of a plurality of history tables in the database.

6. The computer implemented method of claim 3, wherein the history table of the manufacturing events in the manufacturing process to build the manufacturing unit is output to a display device for a user to review.

7. The computer implemented method of claim 1, wherein the time is a timestamp, and wherein the timestamp determines when the one or more parts or subassemblies were installed into the manufacturing unit or when the one or more previously installed parts or subassemblies were removed from the manufacturing unit.

* * * * *